(12) United States Patent
Bitterfeld et al.

(10) Patent No.: US 11,461,673 B2
(45) Date of Patent: Oct. 4, 2022

(54) SHARED MACHINE LEARNING MODEL FOR APPLICATION DISCOVERY

(71) Applicant: ServiceNow, Inc., Santa Clara, CA (US)

(72) Inventors: Robert Bitterfeld, Petach Tikva (IL); Aviya Aron, Shafir (IL); Asaf Garty, Sdei Hemed (IL); Bary Solomon, Petach Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 325 days.

(21) Appl. No.: 16/594,748

(22) Filed: Oct. 7, 2019

(65) Prior Publication Data

US 2021/0103828 A1    Apr. 8, 2021

(51) Int. Cl.
| | |
|---|---|
| *G06N 5/02* | (2006.01) |
| *H04L 67/00* | (2022.01) |
| *H04L 41/00* | (2022.01) |
| *G06N 20/00* | (2019.01) |

(52) U.S. Cl.
CPC ............. *G06N 5/027* (2013.01); *G06N 20/00* (2019.01); *H04L 41/20* (2013.01); *H04L 67/34* (2013.01)

(58) Field of Classification Search
CPC ........ G06N 5/027; G06N 20/00; G06N 20/20; H04L 41/20; H04L 67/34; H04L 41/0853; H04L 41/12; H04L 41/145
See application file for complete search history.

(56) References Cited

U.S. PATENT DOCUMENTS

| | | |
|---|---|---|
| 5,978,594 A | 11/1999 | Bonnell |
| 6,321,229 B1 | 11/2001 | Goldman |
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |

(Continued)

*Primary Examiner* — Javier O Guzman
(74) *Attorney, Agent, or Firm* — Fletcher Yoder PC

(57) ABSTRACT

A system may include persistent storage configured to store: a shared classification model including a plurality of classifiers based on training data from a plurality of managed networks, and a representation of a plurality of software applications executable computing devices within a particular managed network. The system may also include a discovery application configured to perform operations including obtaining attributes of a software process. The operations may also include determining, by way of the shared classification model and based on the attributes, a suggested classifier of the plurality of classifiers and determining, by way of the suggested classifier and based on the attributes, a suggested classification for the software process. The operations may further include receiving an indication that the suggested classification has been accepted, based on receiving the indication, updating the representation to indicate the suggested classification, and storing, in the persistent storage, the representation as updated.

21 Claims, 12 Drawing Sheets

(56) References Cited

U.S. PATENT DOCUMENTS

| | | | |
|---|---|---|---|
| 7,392,300 B2 | 6/2008 | Anantharangachar | |
| 7,610,512 B2 | 10/2009 | Gerber | |
| 7,617,073 B2 | 11/2009 | Trinon | |
| 7,685,167 B2 | 3/2010 | Mueller | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,877,783 B1 | 1/2011 | Cline | |
| 7,890,802 B2 | 2/2011 | Gerber | |
| 7,925,981 B2 | 4/2011 | Pourheidar | |
| 7,930,396 B2 | 4/2011 | Trinon | |
| 7,933,927 B2 | 4/2011 | Dee | |
| 7,945,860 B2 | 5/2011 | Vambenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,151,261 B2 | 4/2012 | Sirota | |
| 8,224,683 B2 | 7/2012 | Manos | |
| 8,261,344 B2 * | 9/2012 | Godwood | G06F 21/564 713/188 |
| 8,266,096 B2 | 9/2012 | Navarrete | |
| 8,380,645 B2 | 2/2013 | Kowalski | |
| 8,402,127 B2 | 3/2013 | Solin | |
| 8,457,928 B2 | 6/2013 | Dang | |
| 8,478,569 B2 | 7/2013 | Scarpelli | |
| 8,554,750 B2 | 10/2013 | Rangaranjan | |
| 8,612,408 B2 | 12/2013 | Trinon | |
| 8,646,093 B2 | 2/2014 | Myers | |
| 8,674,992 B2 | 3/2014 | Poston | |
| 8,743,121 B2 | 6/2014 | De Peuter | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Mueller | |
| 8,875,286 B2 * | 10/2014 | Friedrichs | G06F 21/564 713/189 |
| 8,887,133 B2 | 11/2014 | Behnia | |
| 9,015,188 B2 | 4/2015 | Behne | |
| 9,037,536 B2 | 5/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,137,115 B2 | 9/2015 | Mayfield | |
| 9,239,857 B2 | 1/2016 | Trinon | |
| 9,317,327 B2 | 4/2016 | Apte | |
| 9,323,801 B2 | 4/2016 | Morozov | |
| 9,363,252 B2 | 6/2016 | Mueeler | |
| 9,412,084 B2 | 9/2016 | Kowalski | |
| 9,467,344 B2 | 10/2016 | Gere | |
| 9,535,737 B2 | 1/2017 | Joy | |
| 9,557,969 B2 | 1/2017 | Sharma | |
| 9,613,070 B2 | 4/2017 | Kumar | |
| 9,645,833 B2 | 5/2017 | Mueller | |
| 9,654,473 B2 | 5/2017 | Miller | |
| 9,659,051 B2 | 5/2017 | Hutchins | |
| 9,766,935 B2 | 9/2017 | Kelkar | |
| 9,792,387 B2 | 10/2017 | George | |
| 9,805,322 B2 | 10/2017 | Kelkar | |
| 9,852,165 B2 | 12/2017 | Morozov | |
| 10,002,203 B2 | 6/2018 | George | |
| 10,063,434 B1 * | 8/2018 | Khanal | G06N 20/00 |
| 10,320,813 B1 * | 6/2019 | Ahmed | H04L 63/1416 |
| 2007/0203952 A1 * | 8/2007 | Baron | G06Q 10/06 |
| 2012/0227105 A1 * | 9/2012 | Friedrichs | G06F 21/564 726/22 |
| 2014/0113588 A1 * | 4/2014 | Chekina | G06F 21/552 455/410 |
| 2015/0121524 A1 * | 4/2015 | Fawaz | G06F 21/552 726/23 |
| 2015/0286820 A1 * | 10/2015 | Sridhara | G06F 21/566 726/23 |
| 2015/0356451 A1 * | 12/2015 | Gupta | G06F 21/552 706/52 |
| 2016/0155069 A1 * | 6/2016 | Hoover | G06F 16/26 706/12 |
| 2016/0285897 A1 * | 9/2016 | Gantman | H04L 63/145 |
| 2016/0337390 A1 * | 11/2016 | Sridhara | G06F 21/566 |
| 2016/0379136 A1 * | 12/2016 | Chen | G06F 21/552 706/12 |
| 2017/0345109 A1 * | 11/2017 | Cejnar | G09B 7/00 |
| 2019/0007434 A1 * | 1/2019 | McLane | G06N 3/084 |
| 2020/0412746 A1 * | 12/2020 | Regentov | H04L 63/1425 |

* cited by examiner

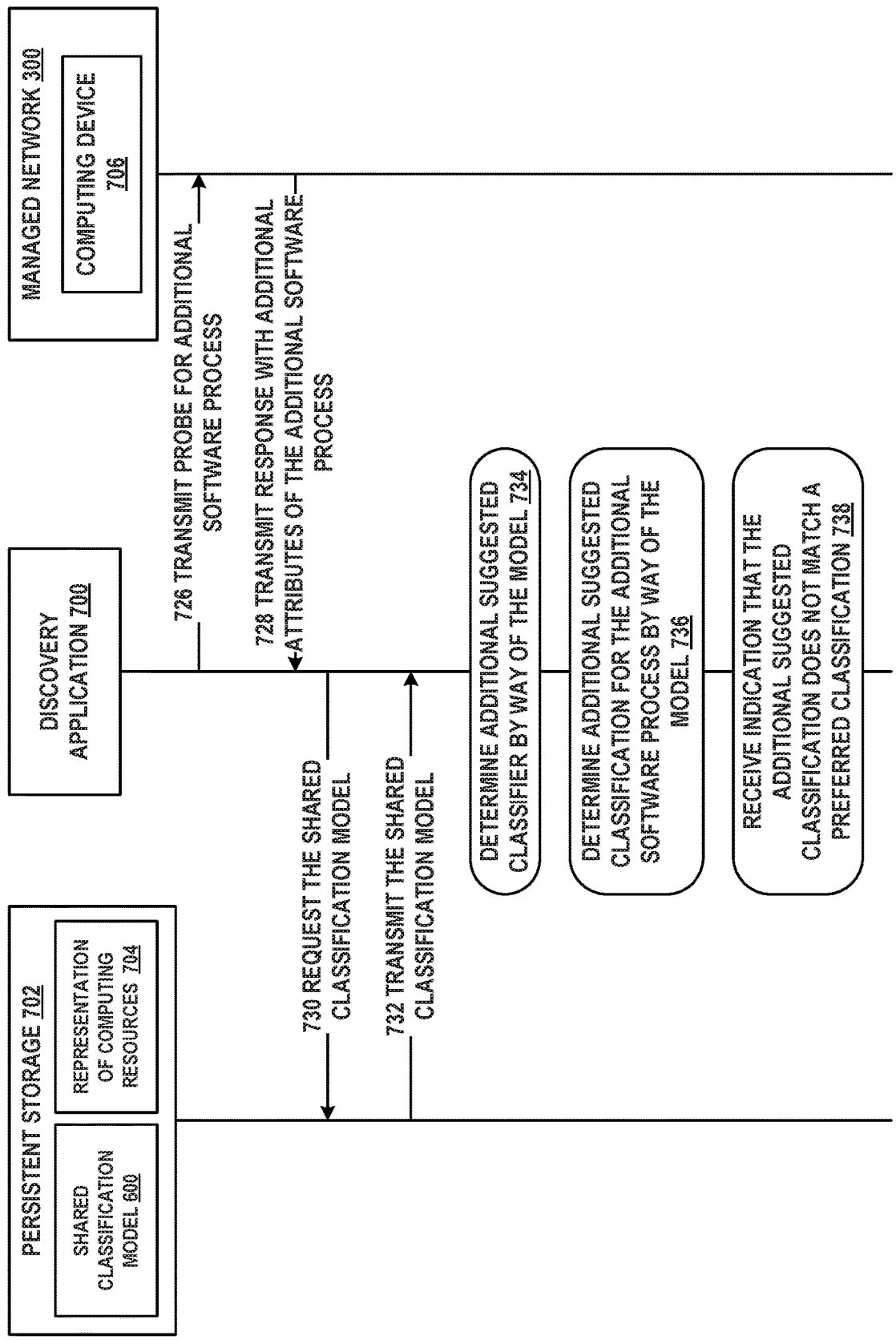

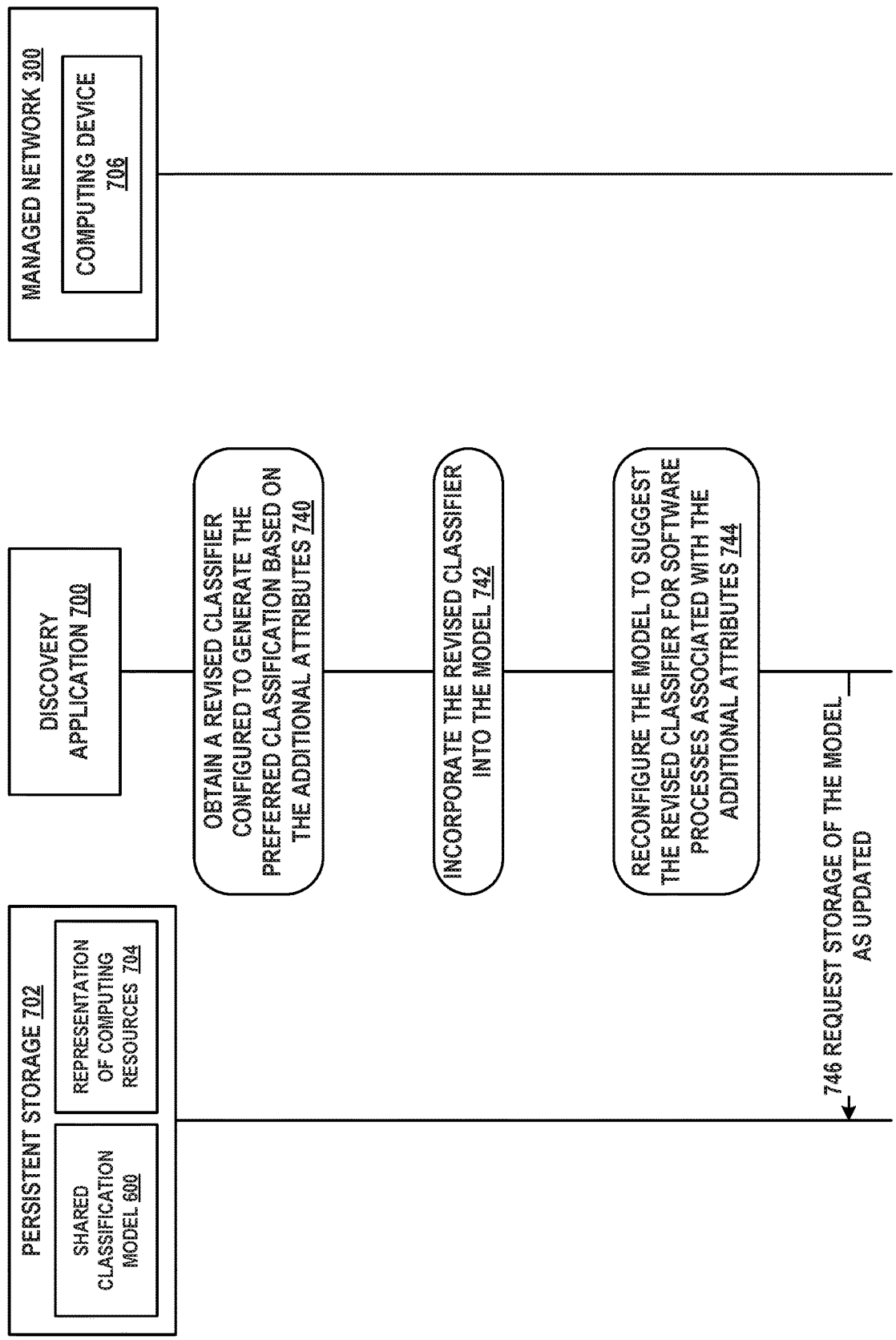

SHARED MACHINE LEARNING MODEL FOR APPLICATION DISCOVERY

BACKGROUND

Computing devices, software applications, storage structures, and other computing resources that make up a computer network may be discovered and the relationships therebetween may be mapped. Representations of these elements of the computer network, as well as the relationships, may be stored as configuration items in a database. The stored configuration items may later be retrieved and used to generate a visualization of a state or arrangement of these elements within the computer network, or used for other purposes. Discovering computing resources involves developing software processes that are capable of gathering the information needed for detection, classification, and/or identification of these computing resources.

SUMMARY

Managed networks may include therein pluralities of different computing devices, operating systems, software applications, and other computing resources. The specific set of computing resources utilized by a managed network may vary from network to network to accommodate the preferences, needs, operations, and/or other factors of a given managed network. For example, managed networks may differ in the types, versions, combinations, and/or other aspects of the computing devices, operating systems, and/or software applications utilized thereby.

Thus, discovering and mapping these computing resources to generate a comprehensive and accurate representation (e.g., a map) thereof may be challenging. Namely, to map a particular computing resource, a discovery pattern may be developed for the particular computing resource. This discovery pattern may be configured to identify the computing resource and collect various information thereabout. In some cases, each variant of the computing resource may necessitate a corresponding discovery pattern. For example, each version of a particular software application may necessitate its own discovery pattern.

Accordingly, as the number of computing resources and variants thereof increases, it may become increasingly difficult to develop and maintain discovery patterns that account for these variations. It may be particularly difficult to keep up with changes in discoverable computing resources when a small number of entities are tasked with developing the discovery patterns. For example, a remote network management platform that manages a plurality of managed networks might not be able to provide a discovery pattern for each computing resource variant present within these managed networks. Instead, the remote network management platform may accommodate a subset of these computing resources that are most prevalent within the managed networks.

While the sets of computing resources utilized by different managed networks may differ, there may nevertheless be at least some overlap among these sets. For example, in at least some cases, a specific variant of a software application may be utilized by two or more managed networks. Thus, if at least one of these managed networks develops and shares a discovery pattern and/or classifier for this variant, the other managed network might not have to redevelop this same pattern and/or classifier.

Accordingly, a discovery application may be configured to facilitate the discovery and mapping process by providing a shared classification model to which multiple different managed networks may contribute and which may be utilized by multiple different managed networks. Specifically, when a discovery pattern and/or classifier is not available for a particular software application, a managed network that discovers and/or maps this software application may generate a classifier and contribute this classifier to the model. Thus, other managed networks discovering and mapping the particular software application at a later time may be able to use the contributed classifier, rather than having to independently generate this or a similar classifier. Notably, the likelihood that the shared classification model contains a classifier for a given software application may increase as the number of managed networks sharing the classification model increases. Thus, the shared classification model allows the discovery and mapping process to benefit from increasing scale.

The shared classification model may be configured to receive as input one or more attributes of a discovered software process. The shared classification model may be applied to this software process after the software process is first discovered, when other discovery patterns fail to classify the software process, and/or in response to instructions received by way of the discovery application (e.g., from a user), among other possibilities. The shared classification model may suggest one or more classifiers to be applied to the attributes, some of which may generate at least one suggested classification. The suggested classification may then be reviewed to determine whether the it is to be accepted or rejected. For example, the suggested classification may be manually compared to the attributes of the software process by a programmer, administrator, or other user, who may provide the acceptance or rejection by way of a user interface of the discovery application. In some implementations, the programmer, administrator, or user may also have the option to select a subset of the suggested classifiers that are used to generate the classifications.

When the suggested classification is rejected, the discovery application may be used to generate a revised classifier configured to generate a preferred classification (e.g., a classification that is more accurate than the suggested classification) based on the attributes of the software process. For example, the revised classifier may be a modified version of the suggested classifier, or may be generated independently of the suggested classifier. The revised classifier may be generated manually by a programmer, or automatically by the discovery application. For example, an indication that the suggested classification is not accepted combined with the attributes of the software process and the preferred classification may be used to retrain the suggested classifier (e.g., when the suggested classifier is a machine learning (ML) classifier).

An indication of whether or not the suggested classification has been accepted may be fed back to the shared classification model. For example, an indication that the suggested classification has been accepted may be used to increase a confidence or accuracy value of the suggested classifier in generating future classifications. Similarly, the revised classifier may be fed back to the shared classification model. Specifically, the revised classifier may be incorporated into the shared classification model, which in turn may be reconfigured to suggest the revised classifier for other software processes having the same or similar attributes as the software process for which the revised classifier was generated.

Thus, the shared classification model may be improved with each execution of such classification and feedback loop. The shared classification model may become more accurate over time and may provide classifiers for an increasing number of different software applications. Notably, while the shared model is herein discussed with respect to software applications, the shared classification model may also be adapted for other types of computing resources, such as, for example, operating systems and hardware devices.

Accordingly, a first example embodiment may involve obtaining, by a discovery application, one or more attributes of a software process corresponding to a software application of a plurality of software applications executable on one or more computing devices within a particular managed network. Persistent storage disposed within a remote network management platform may be configured to store a representation of the plurality of software applications. The first example embodiment may also involve determining, by the discovery application, based on the one or more attributes, and by way of a shared classification model comprising a plurality of classifiers configured to classify software applications among a plurality of predetermined categories, a suggested classifier of the plurality of classifiers. The plurality of classifiers may be based on training data acquired from a plurality of managed networks associated with the remote network management platform. The first example embodiment may additionally involve determining, by the discovery application, by way of the suggested classifier, and based on the one or more attributes, a suggested classification for the software process. The first example embodiment may yet additionally involve receiving, by the discovery application, an indication that the suggested classification has been accepted. The first example embodiment may further involve, based on receiving the indication, updating, by the discovery application, the representation to indicate the suggested classification for the software application. The first example embodiment may yet further involve storing, in the persistent storage, the representation as updated.

In a second example embodiment, a computing system may include persistent storage disposed within a remote network management platform. The persistent storage may be configured to store a shared classification model comprising a plurality of classifiers configured to classify software applications among a plurality of predetermined categories. The plurality of classifiers may be based on training data acquired from a plurality of managed networks associated with the remote network management platform. The persistent storage may also be configured to store a representation of a plurality of software applications executable on one or more computing devices within a particular managed network. The computing system may also include a discovery application configured to perform operations including obtaining one or more attributes of a software process corresponding to a software application of the plurality of software applications. The operations may also include determining, by way of the shared classification model and based on the one or more attributes, a suggested classifier of the plurality of classifiers. The operations may additionally include determining, by way of the suggested classifier and based on the one or more attributes, a suggested classification for the software process. The operations may yet additionally include receiving an indication that the suggested classification has been accepted. The operations may further include, based on receiving the indication, updating the representation to indicate the suggested classification for the software application. The operations may yet further include storing, in the persistent storage, the representation as updated.

In a third example embodiment, an article of manufacture may include a non-transitory computer-readable medium, having stored thereon program instructions that, upon execution by a computing system, cause the computing system to perform operations in accordance with the first example embodiment or the second example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment or the second example embodiment.

In a fifth example embodiment, a system may include various means for carrying out each of the operations of the first example embodiment or the second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 7A, 7B, and 7C are message flow diagrams, in accordance with example embodiments.

DETAILED DESCRIPTION

Figure 1:
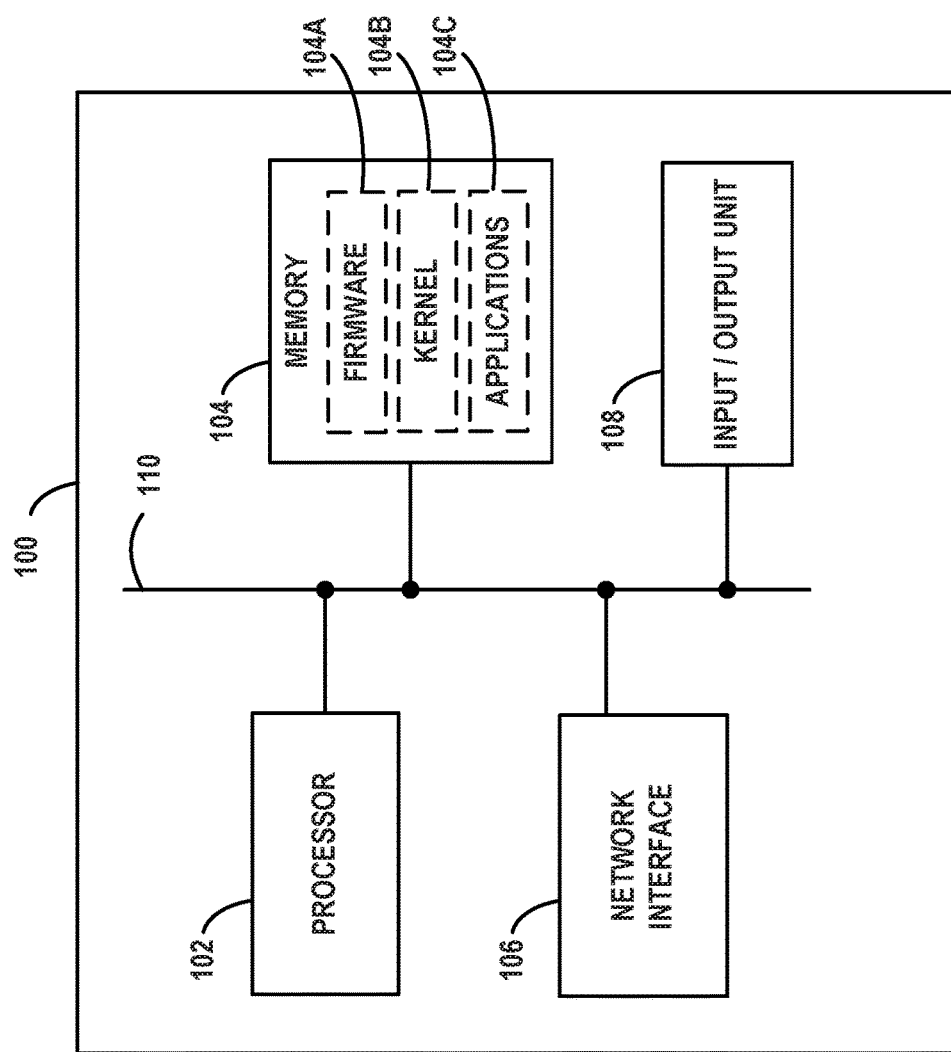
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
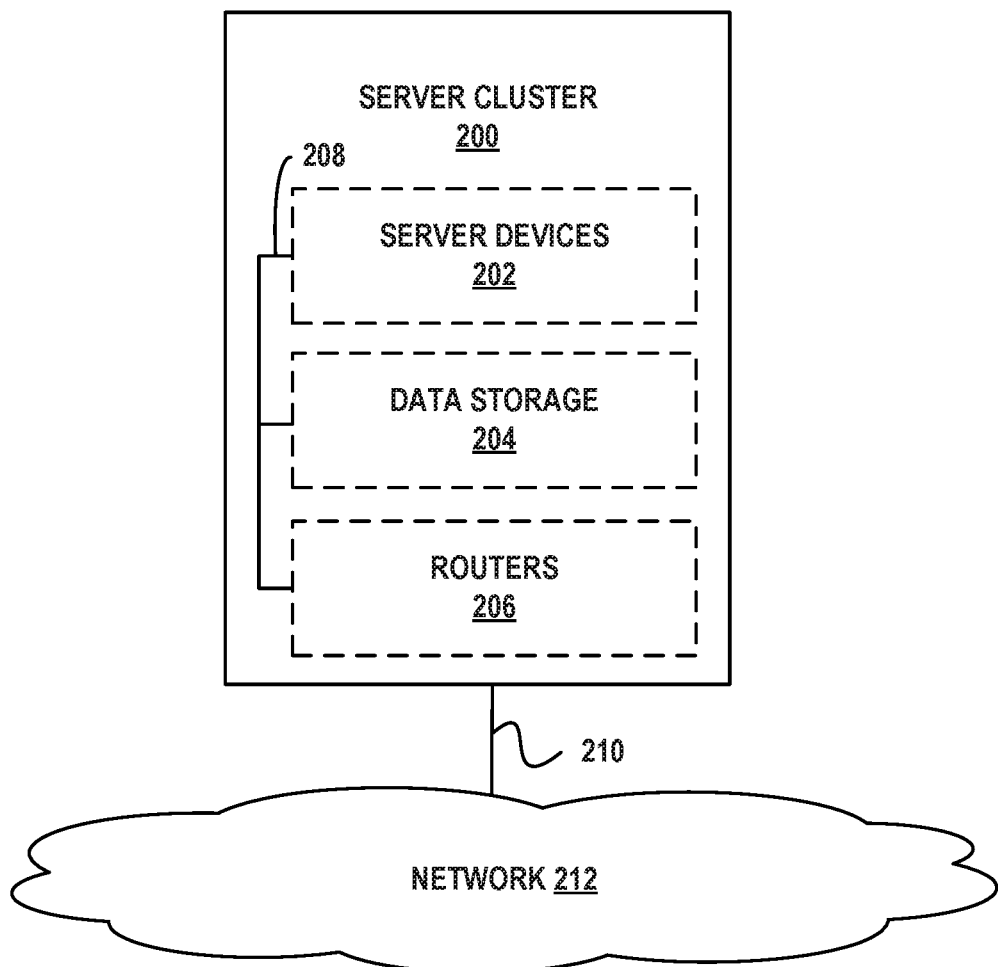
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
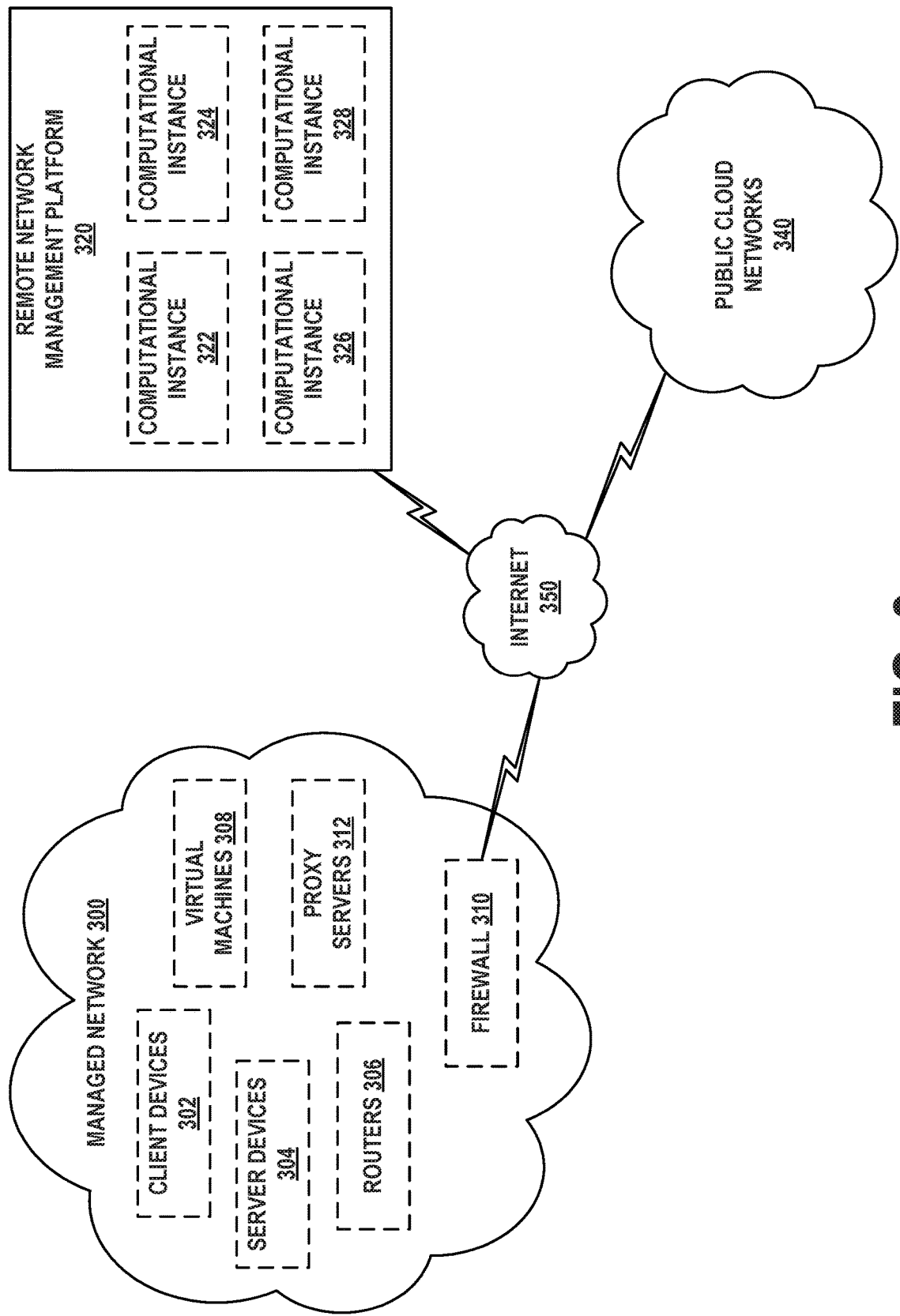
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
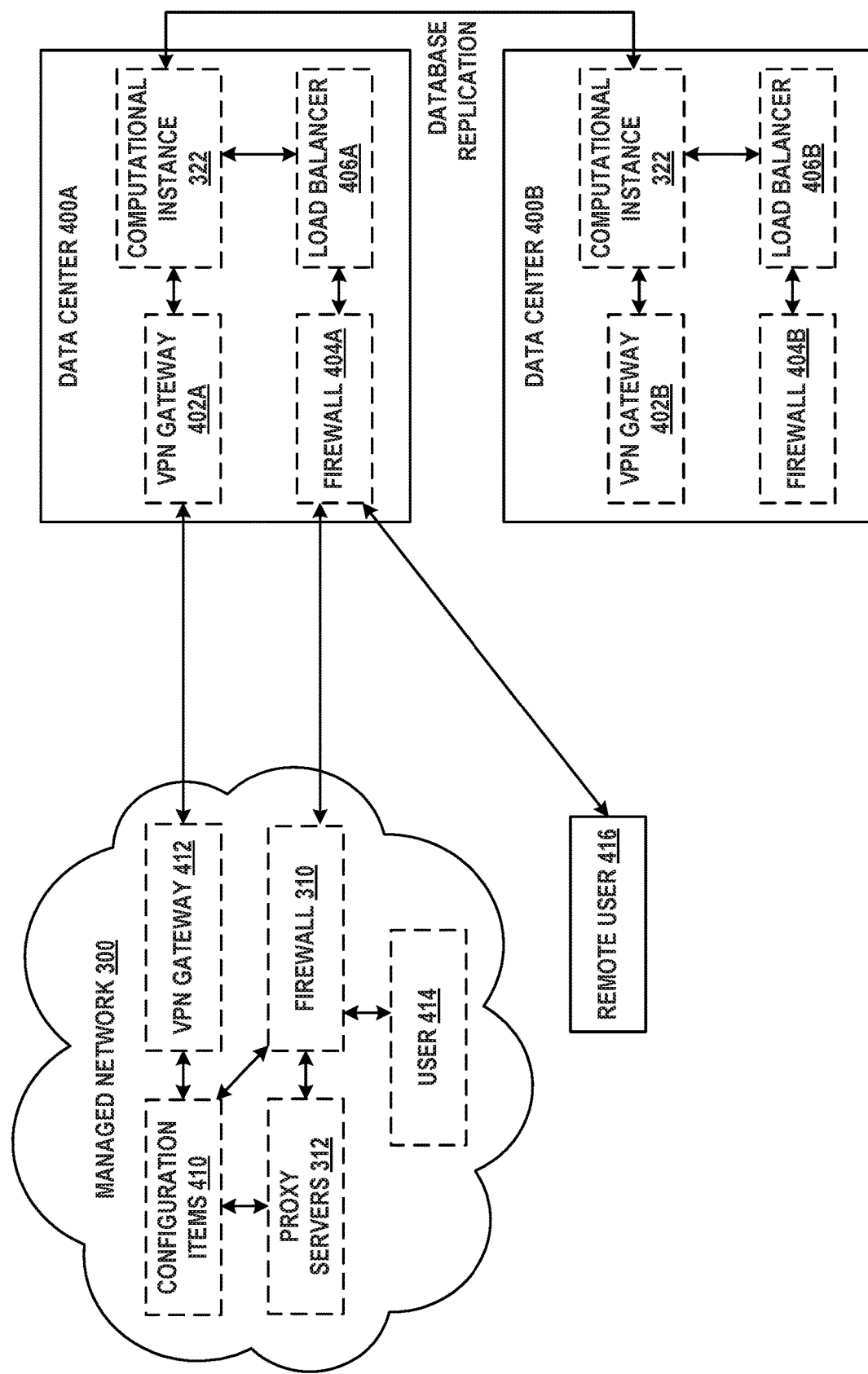
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
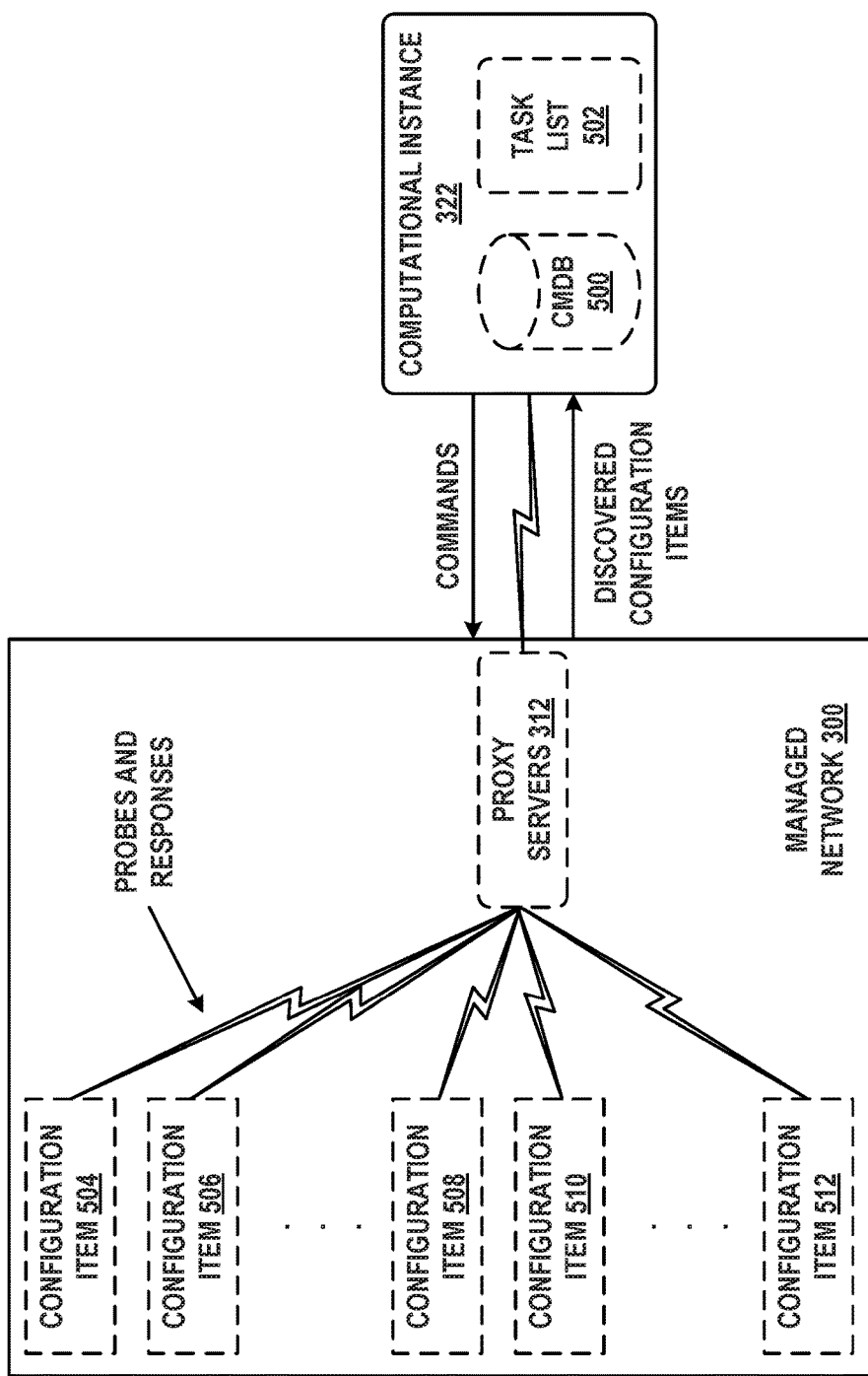
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined.

As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
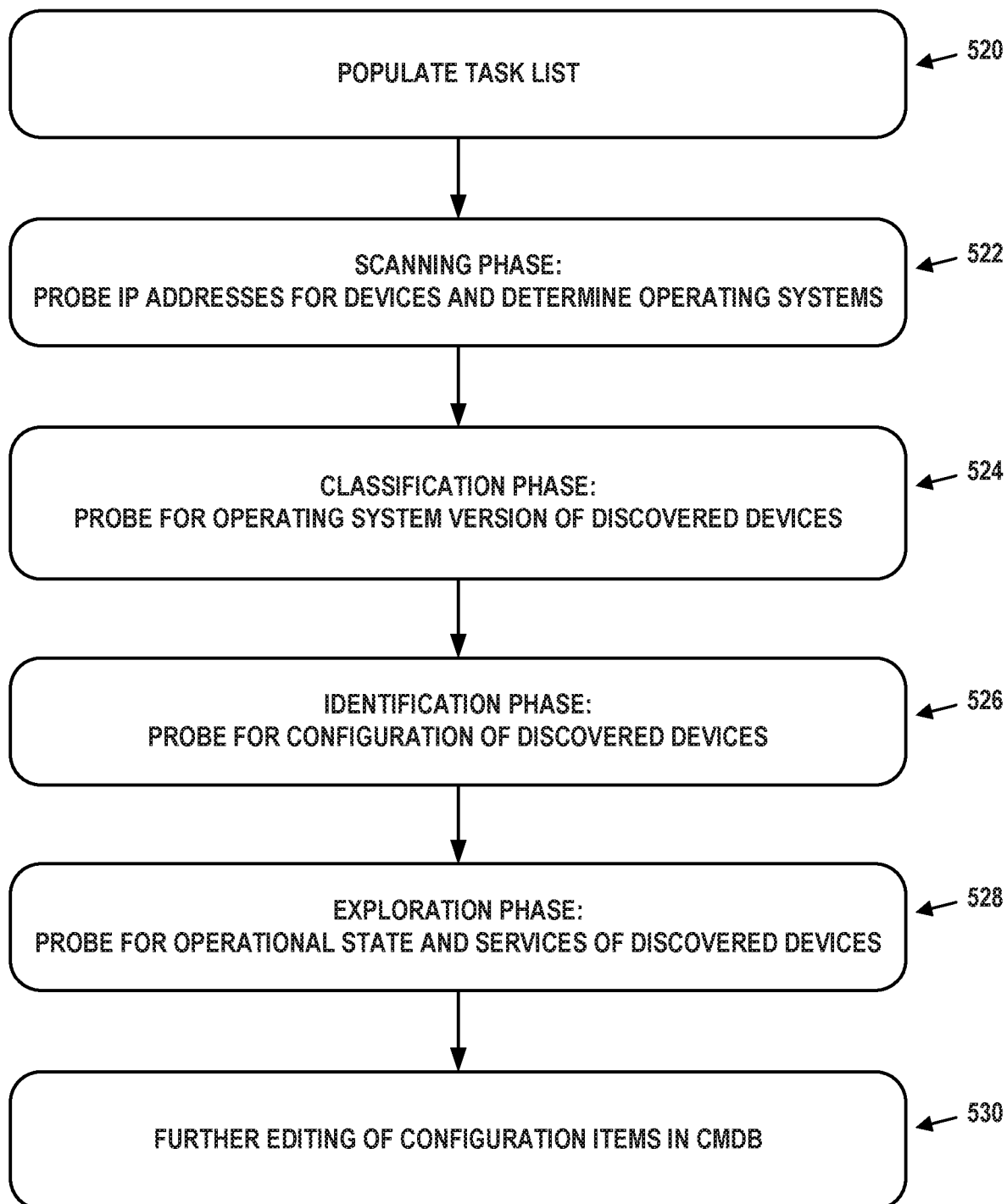
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Shared Classification Model

Managed networks may include therein pluralities of computing devices, operating systems, software applications, and other computing resources. Due to varying preferences, needs, operations, and/or other factors among these managed networks, the computing resources may differ among these managed networks. For example, some managed networks may use software applications that other managed networks do not use, or may use versions of these software applications that differ from versions used by the other managed networks. As the number and size of managed networks increases, it may become increasingly difficult for remote network management platform 320 to develop and maintain discovery patterns that account for some of these variations among computing resources across managed networks.

Notably, there may be overlap among some of the managed networks in terms of the computing resources used thereby. For example, a first managed network may use a software application that is also used by at least a second managed network even though this software application might not be used by the remaining managed networks. When a discovery pattern and/or classifier for this software application is not provided by remote network management platform 320, at least one of the first or second managed networks may independently develop such a discovery pattern and/or classifier. Thus, by including such discovery patterns and/or classifiers in a shared model, the discovery patterns and/or classifiers developed by one managed network may be reused by a plurality of other managed networks. In fact, an increase in the size and number of managed networks may be advantageous when using such a shared model. Namely, increasing the number of contributors to the shared model may increase the likelihood that a discovery pattern and/or classifier is available for a given software application or version thereof.

Figure 6A:
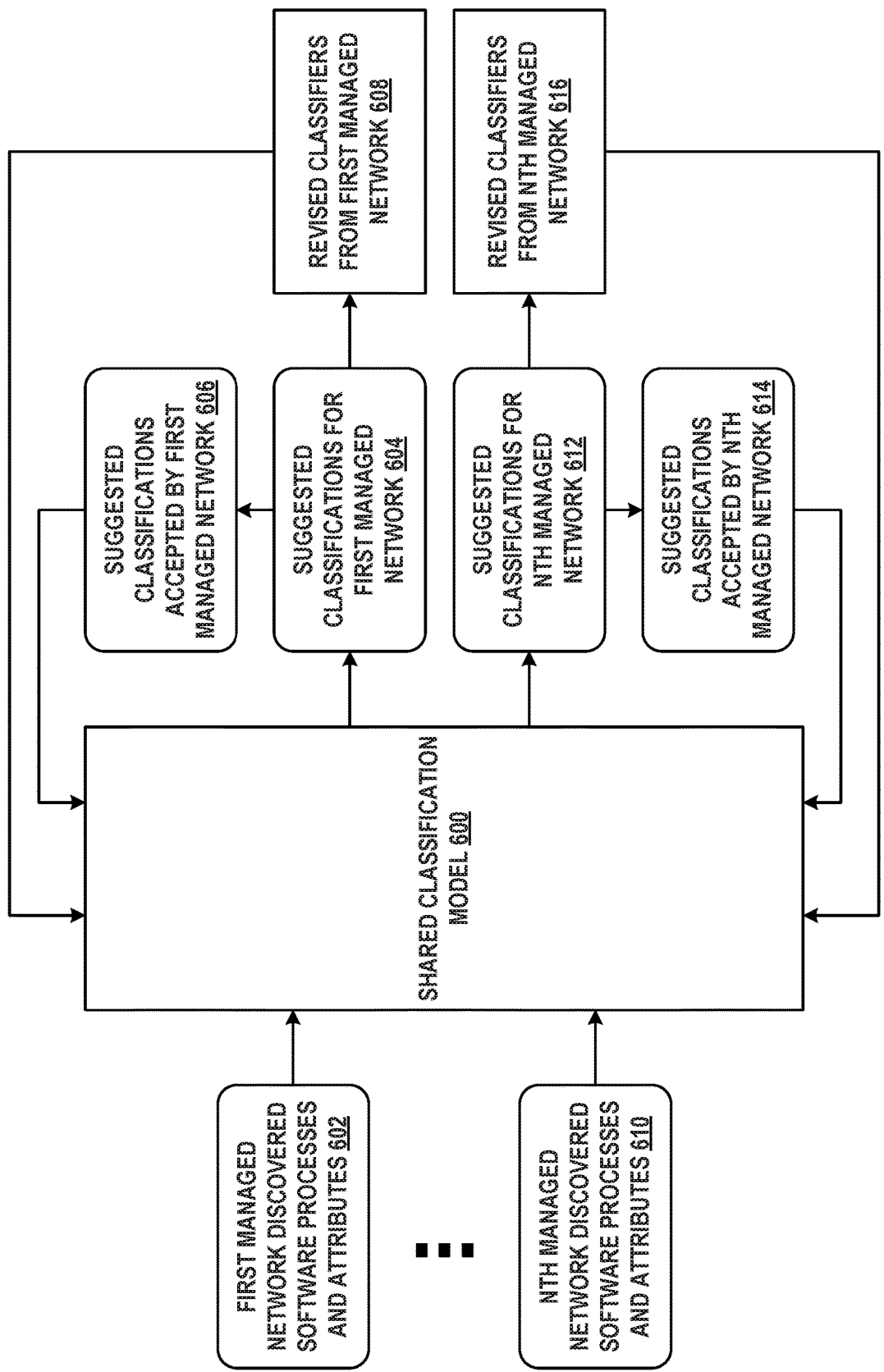
FIG. 6A illustrates feedback for a shared classification model, in accordance with example embodiments.
Figure 6B:
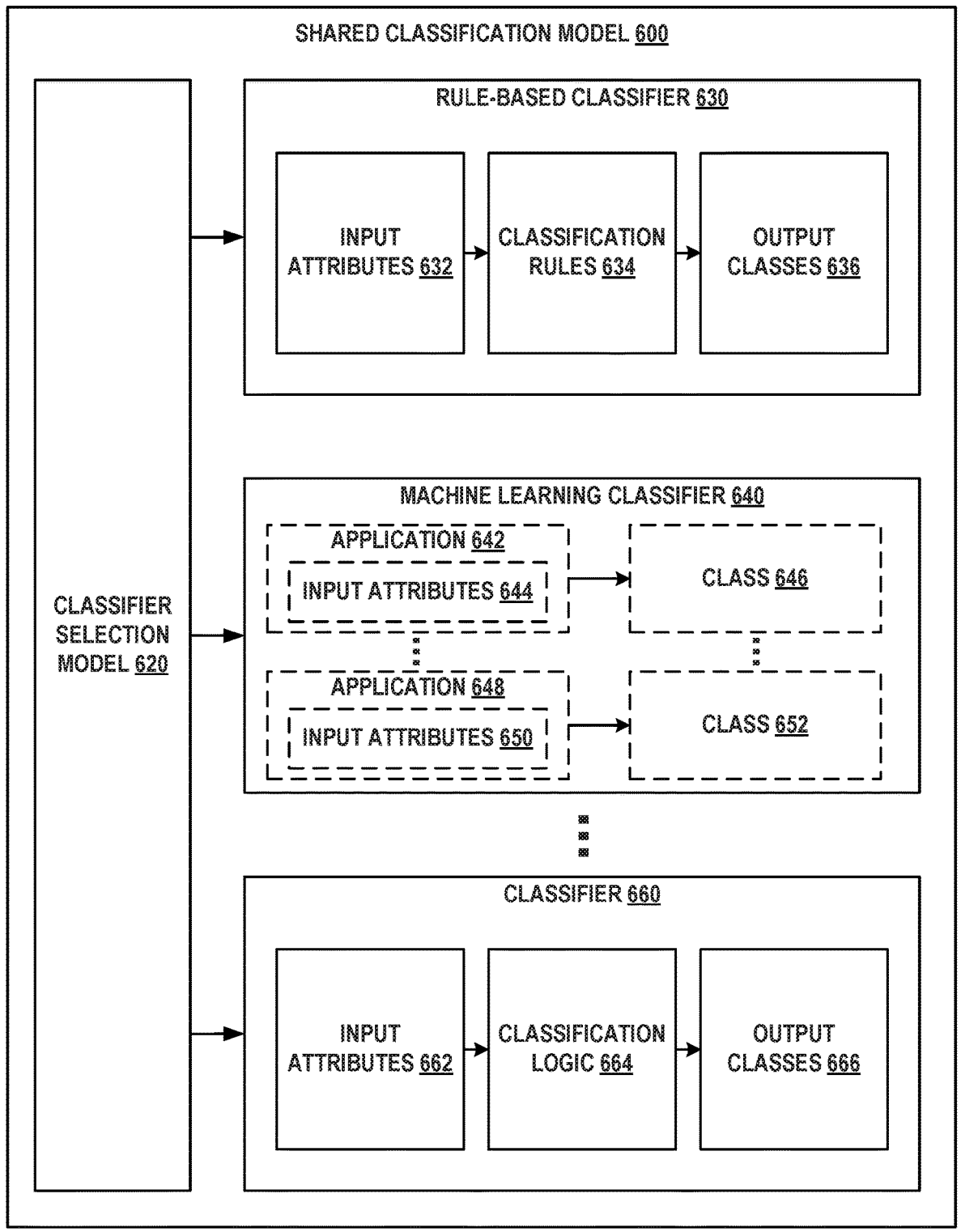
FIG. 6B illustrates an architecture of a shared classification model, in accordance with example embodiments.

FIGS. 6A and 6B illustrate a shared classification model that may be generated based on data obtained from multiple different managed networks. Specifically, as shown in FIG. 6A, shared classification model 600 may be used to generate suggested classifications for software processes and/or software applications identified within a plurality of different managed networks. Such suggested classifications may facilitate the process of discovering and mapping the computing resources that are present within these managed networks. Notably, once one managed network generates a classifier for a particular software process, that classifier may be reused by other managed networks.

For example, shared classification model 600 may be provided with the software processes and the attributes thereof identified within a first managed network, as indicated by block 602. Based on these software processes and attributes, shared classification model 600 may be configured to generate suggested classifications for the software processes within the first managed network, as indicated by block 604. Specifically, the set of attributes associated with a particular software process may be indicative of and sufficient to determine a suggested classification for the particular software process, and thus also the software application to which this software process corresponds. The suggested classifications may be reviewed to determine whether the suggested classifications are acceptable (e.g., correct, accurate, true, or otherwise free of errors) or erroneous. For example, a programmer, administrator, or other user associated within the first managed network may review the suggested classifications and either accept or reject these classifications.

Thus, suggested classifications that have been accepted by the first managed network may be obtained, as indicated by block 606. An indication of the suggested classifications that have been accepted may be fed back to shared classification model 600. Such feedback may reinforce the confidence associated with future classifications of the same or similar software processes.

In some cases, revised classifiers may be generated for the software processes associated with suggested classifications that have not been accepted, as indicated by block 608. These revised classifiers may be modified versions of the suggested classifiers or entirely new and/or independent classifiers. The revised classifiers may be generated manually (e.g., by a programmer associated with the first managed network) or automatically (e.g., by a discovery application retraining a machine learning (ML) model and/or modifying rule-based logic). Regardless of the manner in which the revised classifiers are generated, the revised classifiers may be fed back into shared classification model 600. Thus, shared classification model 600 may be updated with additional and/or revised logic that may allow shared classification model 600 to more accurately classify certain software processes to which the revised classifiers correspond.

The operations of this classification and feedback loop may be carried out for a plurality of managed networks. With each iteration of this loop, the number of software processes that shared classification model 600 is able to accurately classify may increase. Thus, for example, the nth managed network may benefit from the logic introduced into shared classification model 600 by any preceding use of model 600 by other managed networks. The nth managed network may provide as input to shared classification model one or more software processes to be classified and attributes associated with these software processes, as indicated by block 610. Shared classification model 600 may generate suggested classification for the software processes of the nth managed network, as indicated by block 612.

When the nth managed network uses shared classification model 600 at a later time than the first managed network, the suggested classifications of block 612 may be more accurate than the suggested classifications of block 604. Specifically, the number of suggested classifications accepted by the nth managed network, as indicated by block 614, may be greater than that indicated by block 606. Similarly, the nth managed network may generate fewer revised classifiers, as indicated by block 616, to correct inaccurate classification than are generated by the first managed network at block 608. The accepted suggested classifications of block 614 and the revised classifiers of block 616 may also be fed back to shared classifier model 600 to further improve the model.

The nth managed network may thus benefit from the additional logic introduced into shared classification model 600 by any prior usage thereof by other managed networks. For example, the nth managed network may utilize the classifiers generated by other managed networks executing the same or similar software applications and/or versions thereof. Further, through such collaboration among managed networks, classifiers might only need to be generated and/or revised once before these classifiers can be used, at least for some time, without modification by other managed networks.

FIG. 6B illustrates an example architecture of shared classification model 600. Specifically, shared classification model 600 may include classifier selection model 620 and a plurality of classifiers 630 and 640 through 660 (i.e., classifiers 630-660). Classifier selection model 620 may be configured to select one or more of classifiers 630-660 to be used for generating a suggested classification of a particular software process. In some implementations, classifier selection model 620 may include an ML model that accepts as input a subset (i.e., some or all) of the attributes associated with the software process and selects, based on the subset, one or more of classifiers 630-660. In other implementations, classifier selection model 620 may additionally or alternatively include rule-based logic. For example, one of classifiers 630-660 may be selected based on one or more of (i) the set of available attributes for a software process matching inputs for the selected classifier, (ii) the values of the available attributes matching one or more values of a predetermined set of values, and/or (iii) the set of available attributes matching one or more patterns (e.g., regular expressions) associated with the selected classifier, among other possibilities.

Classifier selection model 620 may act as a filter that narrows down the set of classifiers 630-660 to a subset likely to correspond to a particular software process. Classifier selection model 620 may thus be especially beneficial where the number of classifiers 630-660 is high, such that, for example, it would be computationally impractical (e.g., the execution time would exceed a time threshold) to attempt to classify the given software process with each of the available classifiers 630-660.

Classifiers 630-660 may include a plurality of different types of classifiers. For example, classifier 630 may be a rule-based classifier. Thus, classifier 630 may be configured to operate on input attributes 632, which may define a plurality of types of attributes. For example, classifier 630 may be specific to a software application that does not accept any input. Accordingly, input attributes 632 may include an attribute representing a command used to invoke the software application but might not include any attributes representing input values or input parameters for the software application. Classifier 630 may also include classification rules 634 configured to process input attributes 632 and, based on the values thereof, select one of output classes 636 as the suggested classification for the software process. The output classes 636 may define, for example, different versions of a particular software application.

Classifier 640 may be an ML classifier. ML classifier 640 may be trained to classify applications among one or more of classes based on training data. The training data may include a plurality of pairs of (i) attributes of a respective software process and (ii) a class of the respective software process. For example, the training data may include (i) class 646 assigned to application 642 having input attributes 644 through (ii) class 652 assigned to application 648 having input attributes 650. This training data is shown with dashed lines to indicate that classifier 640 is trained using this data, but this data is not necessarily explicitly present as part of classifier 640.

Classifier 660 represents a general classifier that may include one or more of rule-based logic and ML models. Namely, classifier 660 may include classification logic 664 configured to classify a software process among output classes 666 based on input attributes 662. Classification logic 664 may include one or more of rule-based logic and ML models.

VI. Example Discovery Operations

Figure 7A:
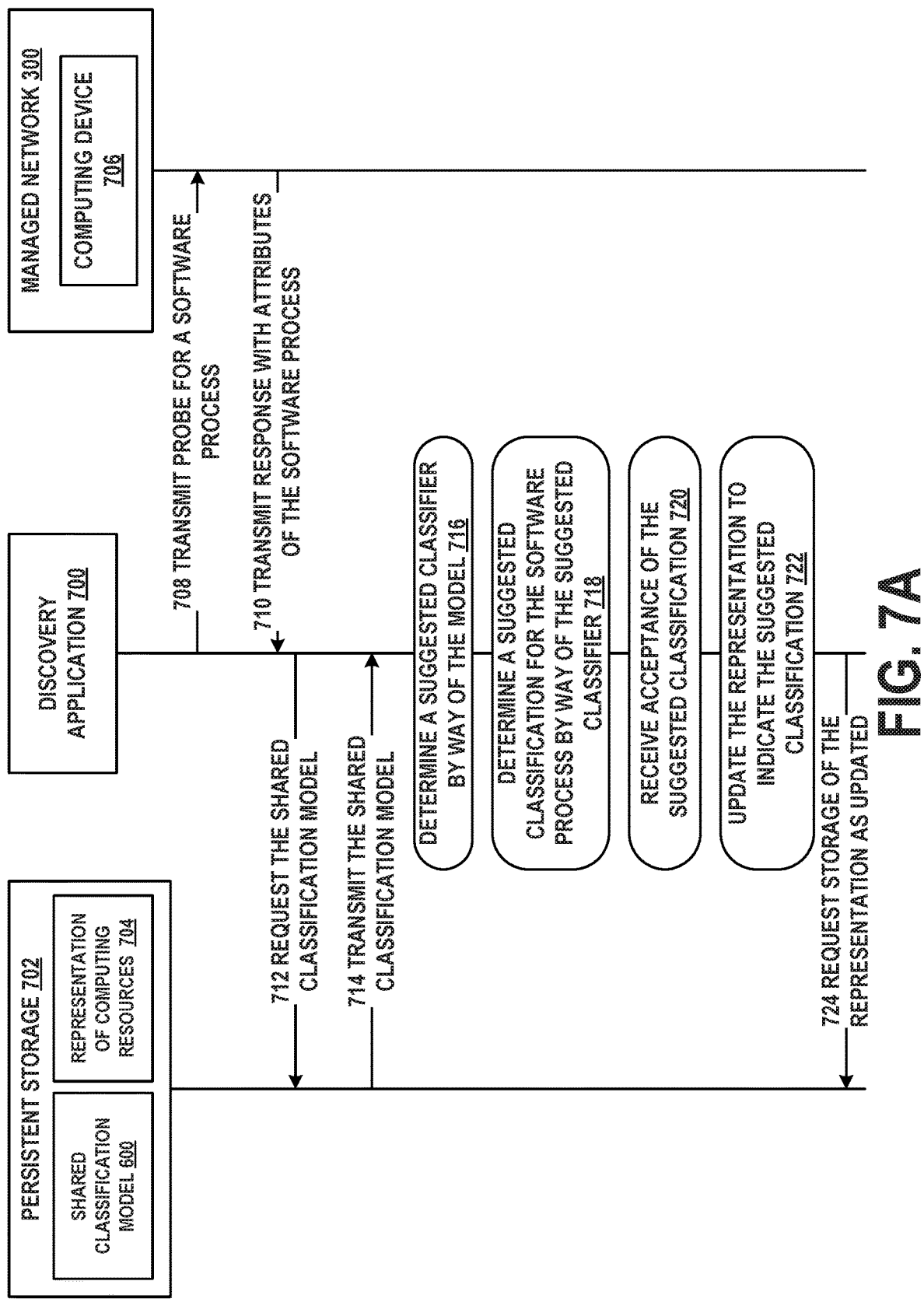

FIGS. 7A, 7B, and 7C illustrate message flow diagrams of operations involved in discovering and mapping elements of a managed network. Specifically, FIGS. 7A, 7B, and 7C illustrate discovery application 700, persistent storage 702, and computing device 706 contained in managed network 300. In one implementation, discovery application 700 and persistent storage 702 may be disposed in or form part of a computational instance (e.g., computational instance 322) of remote network management platform 320. This computational instance may be assigned to managed network 300, and thus used to discover, map, and/or adjust various computing resources associated therewith. In other implementations, portions of discovery application 700 may be disposed in, form part of, or be executed with the assistance of proxy servers 312. For example, some or all portions of a discovery pattern or process deployed by discovery application 700 may be executed by proxy servers 312.

Persistent storage 702 may be configured to store therein shared classification model 600, as well as representation of computing resources 704 associated with managed network 300. Persistent storage 702 may, in some implementations, include and/or take the form of a database. The representation may be in the form of a mapping that includes a plurality of computing devices associated with managed network 300, a plurality of software applications executable on one or more of these computing devices, and interconnections between these computing devices and software applications, among other information. The mapping may be stored in persistent storage 702 as configuration items, which may be retrieved from persistent storage 702 by various computing devices and used to generate a visualization of the mapping. Discovery application 700 may be configured to generate the mapping and modify the mapping over time as the state of managed network 300 changes. Other uses of configuration items beyond that of visualization have been described above.

In some implementations, discovery application 700 may be configured to discover and map the software applications available within managed network 300 based on software processes executing on computing devices within managed network 300. To that end, discovery application 700 may be configured to transmit, to computing device 706, a probe for software processes executing on computing device 706, as indicated by arrow 708. The probe may include, for example, a command configured to invoke an operating system shell function (e.g., "ps" on LINUX®) configured to generate a list of the executing software processes. The list may indicate, for each executing software process, one or more attributes. For example, the list may indicate, for each software process, one or more of a name of the software process, a name of an executable file associated with the software process, a command used to invoke execution of the software process, any input values and other input parameters provided along with this command, a file system directory associated with the software process, and/or any contents of this file system directory, among other possible attributes. In other implementations, software processes and/or software applications may be discovered in other ways, such as, for example, by probing the file system for files indicative of installed software application, without relying on active execution of these software applications.

Based on or in response to reception of the probe at arrow 708 and execution of the instructions therein, computing device 706 may be configured to transmit, to discovery application 700, a response that identifies the software processes and indicates the attributes of each of these software processes, as indicated by arrow 710. The attributes of a given software process may be used by discovery application 700 to classify the software process and/or the software application to which the software process corresponds. Thus, based on or in response to obtaining the attributes of the software process at arrow 710, discovery application 700 may be configured to request, from persistent storage 702, shared classification model 600, as indicated by arrow 712. Based on or in response to reception of the request at arrow 712, persistent storage 702 may be configured to transmit, to discovery application 700, shared classification model 600, as indicated by arrow 714. Specifically, the version of shared classification model 600 transmitted at arrow 714 may be a most recent version thereof that includes any changes made to model 600 in view of any feedback from other managed networks.

In some implementations, the attributes of the software process may be stored in persistent storage 702 prior to the software process being classified by shared classification model 600. For example, the attributes may be incorporated into representation of computing resources 704, and the software process and/or the software application corresponding thereto may be indicated as unclassified. The attributes may be retrieved for classification by shared classification model 600 at a later time. For example, the classification of discovered software processes may be carried out in response to user input, after a certain threshold number of processes have been identified, or after each of the computing devices within managed network 300 have had the software processes executing thereon identified, among other possibilities.

Based on or in response to reception of shared classification model 600 at arrow 714, discovery application 700 may be configured to determine a suggested classifier for the software process, as indicated at block 716. The suggested classified may be generated by way of shared classification model 600 and based on the attributes of the software process. For example, the suggested classifier may be selected from classifiers 630-660 by classifier selection model 620 based on a first subset of the attributes. In some implementations, a plurality of suggested classifiers may be determined, each of which may be suggested by way of a user interface of discovery application 700. For example, the top three most likely classifiers may be suggested. A user may be able to select, by way of the user interface, one or more of these suggested classifiers to be applied to the software process. Such selection of the suggested classifiers may generate additional training data for classifier selection model 620.

Based on or in response to determination of the suggested classifier at block 716, discovery application 700 may be configured to determine a suggested classification for the software process, as indicated by block 718. The suggested classification may be generated by way of the suggested classifier and based on the attributes of the software process. For example, when classifier 630 is selected at block 716, classifier 630 may be used to determine the classification based on a second subset of the attributes.

Notably, such classification of the software process may be carried out without remote network management platform 320 developing a classifier specific to the software process. Instead, the classifier may be sources from other managed networks that have previously identified and classified the software application associated with the software process indicated at arrow 710.

Based on or in response to determination of the classification at block 718, discovery application 700 may be configured to receive acceptance of the suggested classification, as indicated by block 720. Receiving the acceptance may involve displaying the suggested classification and the attributes of the software process by way of a user interface of the discovery application 700. The suggested classification and the attributes of the software process may be manually compared and evaluated by a programmer, administrator, or other user associated with managed network 300. Based on such a comparison, the programmer, administrator, or other user may indicate, by way of the user interface, that the suggested classification is correct, true, accurate, and/or otherwise without error, thus indicating acceptance of the suggested classification.

Based on or in response to reception of the acceptance at block 720, discovery application 700 may be configured to update representation of computing resources 704 to indicate therein the suggested classification for the software process, as indicated by block 722. In cases where the software process is not yet represented in representation of computing resources 704, new configuration items may be added to this representation to indicate the software process, its attributes, and/or its classification. In cases where the software process is represented as an unclassified process in representation of computing resources 704, existing configuration items of this representation may be updated to indicate the suggested classification. Based on or in response to updating the representation at block 722, discovery application 700 may be configured to request storage of the representation as updated in persistent storage 702, as indicated by arrow 724.

Further, in some implementations, an indication of the acceptance of the suggested classification may be fed back into shared classification model 600. Specifically, the combination of the attributes of the software process and the suggested classification may provide additional training data for shared classification model 600. In some implementations, shared classification model 600 or portions thereof may be updated (e.g., re-trained) in view of this additional training data. This feedback process may be analogous to that illustrated in FIGS. 7B and 7C for a suggested classification that is not accepted.

In some implementations, discovery application 700 may also include a plurality of classifiers that have not been obtained from managed networks, but have instead been developed by remote network management platform 320. Such classifiers may form part of discovery patterns configured to identify corresponding software applications based on the attributes of the corresponding software processes and, based on this identification, obtain additional information about the software applications. However, due to the large number of possible software applications and versions thereof, remote network management platform 320 might lack discovery patterns for some software applications and/or software processes. Shared classification model 600 may be used as a back-up in such cases. Thus, in some implementations, shared classification model 600 may be used to classify a software process based on or in response to the software process being unclassified by the discovery patterns provided by remote network management platform 320.

In other implementations, the discovery patterns and/or classifiers provided by remote network management platform 320 might form part of shared classification model 600. Thus, shared classification model 600 may be used to classify each discovered software process. When a discovery pattern and/or classifier provided by remote network management platform 320 is available for a particular software process, this pattern and/or classifier may be suggested by shared classification model 600 and used to classify the particular software process.

FIGS. 7B and 7C illustrate operations carried out in the case where a suggested classification for an additional software process is not accepted. Instead, a revised classifier is obtained from the managed network and used to update shared classification model 600 so that future classifications of processes with the same or similar attributes in other managed networks are correct or at least less likely to be erroneous. While FIGS. 7B and 7C imply that the operations thereof are executed after those of FIG. 7A, this is not necessarily the case. For example, several revised classifiers may be provided to shared classification model 600 before a suggested classification is first accepted. Thus, the ordering of execution of the operations of FIGS. 7A and 7B/C is interchangeable.

Discovery application 700 may be configured to transmit, to computing device 706, a probe for additional software processes executing on computing device 706, as indicated by arrow 726. The probe at arrow 726 may be analogous to that at arrow 708. Based on or in response to reception of the probe at arrow 726 and execution of the instructions therein, computing device 706 may be configured to transmit, to discovery application 700, a response that identifies the additional software process and indicates one or more additional attributes of the additional software process, as indicated by arrow 728. The attributes of the additional software process may be used by discovery application 700 to classify the additional software process and/or the software application to which the additional software process corresponds.

Thus, based on or in response to obtaining the additional attributes of the software process at arrow 710, discovery application 700 may be configured to request, from persistent storage 702, shared classification model 600, as indicated by arrow 730. Based on or in response to reception of the request at arrow 730, persistent storage 702 may be configured to transmit, to discovery application 700, shared classification model 600, as indicated by arrow 732. The version of shared classification model 600 transmitted at arrow 732 may be a most recent version thereof that includes any changes made to model 600 (e.g., since the model was retrieved at arrow 714) in view of any feedback from other managed networks.

Based on or in response to reception of shared classification model 600 at arrow 732, discovery application 700 may be configured to determine an additional suggested classifier for the additional software process, as indicated at block 734. The additional suggested classified may be generated by way of shared classification model 600 and based on the additional attributes of the additional software process. Based on or in response to determination of the additional suggested classifier at block 734, discovery application 700 may be configured to determine an additional suggested classification for the additional software process, as indicated by block 736. The additional suggested classification may be generated by way of the additional suggested classifier and based on the additional attributes of the additional software process. For example, when classifier 640 is selected at block 734, classifier 640 may be used to determine the additional classification based on a subset of the additional attributes.

Based on or in response to determination of the additional classification at block 736, discovery application 700 may be configured to receive an indication that the additional suggested classification does not match a preferred classification of the additional software process, as indicated by block 738. Receiving this indication may involve displaying the additional suggested classification and the additional attributes of the additional software process by way of a user interface of the discovery application 700. The additional suggested classification and the additional attributes of the software process may be manually compared and evaluated by a programmer, administrator, or other user associated with managed network 300. Based on such a comparison, the programmer, administrator, or other user may indicate, by way of the user interface, that the additional suggested classification is incorrect, inaccurate, and/or otherwise erroneous, thus indicating that the additional suggested classification does not match the preferred classification. The preferred classification may be one that the programmer, administrator, or other user believes to be correct, true, accurate, and/or otherwise without error.

Based on or in response to reception of the indication at block 738, discovery application 700 may be configured to obtain a revised classifier configured to generate the preferred classification based on the additional attributes, as indicated by block 740. In some cases, the programmer, administrator, or other user may use discovery application 700 to generate the revised classifier based on or in response to determining that the suggested classification does not match a preferred classification of the additional software process.

For example, the revised classifier may be generated by modifying the suggested classifier. Specifically, the rules, logic, or model of the suggested classifier may be adjusted (e.g., by the programmer) such that the additional attributes are mapped to the preferred classification rather than to the suggested classification. In another example, the revised classifier may be generated independently of the suggested classifier. That is, the rules, logic, or model of the revised classifier may be generated without considering the rules, logic, or model of the suggested classifier.

In other implementations, discovery application 700 may be configured to generate the revised classifier based on or in response to determining that the suggested classification does not match a preferred classification of the additional software process. For example, the additional suggested classifier may include an ML model determined using training data that includes pairs of (i) software process attributes and (ii) corresponding classifications of the software process. The preferred classification and the additional attributes of the additional software process may be incorporated into this training data. The ML model may be retrained based on this expanded training data set, thus increasing the likelihood that the ML model will suggest the preferred classification when provided with the additional attributes of the software process as input.

In another example, a revised rule-based classifier may be obtained from managed network 300. Rather than directly incorporating this rule-based classifier into shared classification model 600, the revised rule-based classifier may instead be used to generate training data for an ML classifier. Specifically, the revised rule-based classifier may be applied to a plurality of sets of attributes corresponding to a plurality of different software processes identified within a plurality of managed network. Thus, the revised rule-based classifier may identify a subset of the different software processes that have the preferred classification. This subset of the different processes may be used in combination with the corresponding sets of attributes to train the ML classifier. Thus, shared classification model 600 may be updated with an ML classifier based on a rule-based revised classifier.

Based on or in response to obtaining the revised classifier at block 740, discovery application 700 may be configured to incorporate the revised classifier into shared classification model 600, as indicate by block 742. In one example, incorporation of the revised classifier into shared classification model 600 may involve replacing or modifying one of classifiers 630-660 with the revised classifier. In another example, incorporation of the revised classifier into shared classification model 600 may involve adding a new classifier (i.e., the revised classifier) to the set of classifiers 630-660.

Further, discovery application 700 may be configured to reconfigure shared classification model 600 to suggest the revised classifier for classifying software processes that are associated with the additional attributes, as indicated by block 744. For example, classifier selection model 620 may be re-trained, modified, or otherwise updated with logic that selects the revised classifier when the additional attributes are provided as input to shared classification model 600. Blocks 742 and 744 may be collectively viewed as updating or modifying shared classification model 600.

Based on or in response to updating shared classification model 600 at blocks 742 and/or 744, discovery application 700 may be configured to request storage of shared classification model 600 as updated in persistent storage 702, as indicated by arrow 746. Thus, the updated shared classification model 600 may be made available for use in classifying software processes of other managed networks. Specifically, the revised classification model obtained based on the software process in managed network 300 may be used to improve the discovery and classification operations for other managed networks. Thus, multiple managed networks may benefit from the revised classifier without having to independently re-generate the revised classifier.

In some implementations, shared classification model 600 may be applied to software processes and/or software applications that are unclassified. In other implementations, however, shared classification model 600 may additionally or alternatively be applied to software processes and/or software applications that have been already classified. Each classification may be assigned a corresponding priority level. For example, classifications may be assigned a priority level based on a confidence metric associated with or generated by the classifier along with the classification. Some of the classifiers of shared classification model 600 may, for example, be configured to generate a confidence metric (e.g., between 0% and 100% confidence) along with the suggested classifications. Classifications generated by a discovery pattern provided by remote network management platform 320 may be associated with a high confidence (e.g., 95%, due to the accuracy of these discovery patterns having been tested), and may thus be assigned a higher priority level than some classifications generated by shared classification model 600 (e.g., a classification with 80% confidence). In another example, classifications that have received explicit approval from a managed network may also be associated with a high confidence (e.g., 100%), and may thus be assigned a higher priority level than classifications lacking such approval.

When software processes are classified or re-classified (e.g., by shared classification model 600), classifications with higher priority levels may automatically supersede or be retained in place of classifications with lower priority levels. On the other hand, when a suggested classification for a software process is associated with a lower priority level than an existing classification for the software process, the suggested classification may nevertheless be considered. For example, discovery application 700 may be configured to provide a prompt that (i) indicates the suggested classification does not match the existing classification and (ii) requests permission to replace the existing classification with the suggested classification. In some cases, such a prompt may be provided when the respective priority levels of the existing and suggested classifications are within some threshold value of one another (e.g., adjacent priority levels). When the suggested classification is determined to be more accurate than the existing classification, discovery application 700 may receive an indication of the permission to replace the existing classification with the suggested classification, and may accordingly make this update.

VII. Example Operations

Figure 8:
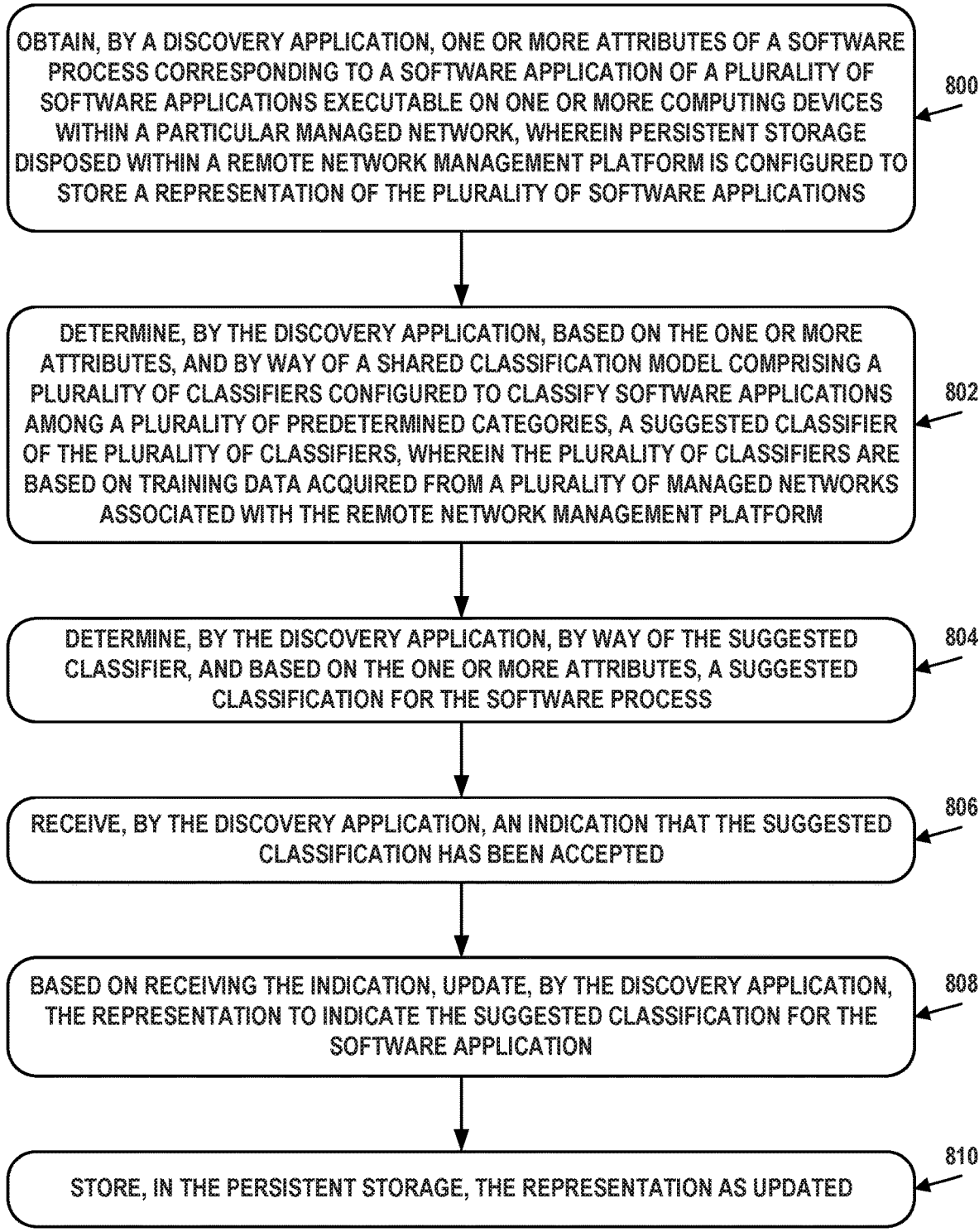
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may involve obtaining, by a discovery application, one or more attributes of a software process corresponding to a software application of a plurality of software applications executable on one or more computing devices within a particular managed network. Persistent storage disposed within a remote network management platform may be configured to store a representation of the plurality of software applications.

Block 802 may involve determining, by the discovery application, based on the one or more attributes, and by way of a shared classification model comprising a plurality of classifiers configured to classify software applications among a plurality of predetermined categories, a suggested classifier of the plurality of classifiers. The plurality of classifiers may be based on training data acquired from a plurality of managed networks associated with the remote network management platform.

Block 804 may involve determining, by the discovery application, by way of the suggested classifier, and based on the one or more attributes, a suggested classification for the software process.

Block 806 may involve receiving, by the discovery application, an indication that the suggested classification has been accepted.

Block 808 may involve, based on receiving the indication, updating, by the discovery application, the representation to indicate the suggested classification for the software application.

Block 810 may involve storing, in the persistent storage, the representation as updated.

In some embodiments, the plurality of classifiers may include a rule-based classifier based on first training data obtained from a first managed network of the plurality of managed networks. The first training data may include a rule-based discovery pattern. The plurality of classifiers may also include an ML classifier based on second training data obtained from a second managed network of the plurality of managed networks. The second training data may include one or more pairs of (i) data indicating a respective software process and one or more attributes corresponding to the respective software process and (ii) a classification for the respective software process.

In some embodiments, one or more additional attributes of an additional software process corresponding to an additional software application of the plurality of software applications may be obtained. An additional suggested classifier of the plurality of classifiers may be determined by way of the shared classification model and based on the one or more additional attributes. An additional suggested classification for the additional software process may be determined by way of the additional suggested classifier and based on the one or more additional attributes. An additional indication that the additional suggested classification does not match a preferred classification associated by the particular managed network with the additional software application may be received. Based on the additional indication, a revised classifier configured to generate the preferred classification based on the one or more additional attributes may be obtained from the particular managed network. The shared classification model may be updated by (i) incorporating into the shared classification model the revised classifier and (ii) reconfiguring the shared classification model to suggest the revised classifier for software processes associated with the one or more additional attributes. The shared classification model as updated may be stored in the persistent storage.

In some embodiments, the revised classifier may include a modified version of the additional suggested classifier that reconfigures the additional suggested classifier to generate the preferred classification based on the one or more additional attributes.

In some embodiments, the revised classifier may be generated independently of the additional suggested classifier.

In some embodiments, the suggested classifier may be a rule-based classifier. The revised classifier may include a rule-based discovery pattern that implements logic configured to generate the preferred classification based on the one or more additional attributes.

In some embodiments, the suggested classifier may be an ML classifier. The revised classifier may include training data for the ML classifier. The training data may include (i) data indicating the additional software process and the one or more additional attributes and (ii) the preferred classification.

In some embodiments, the revised classifier may include a rule-based discovery pattern that implements logic configured to generate the preferred classification based on the one or more additional attributes. Updating the shared classification model may include obtaining, from one or more managed networks of the plurality of managed networks, a plurality of data indicating (i) a plurality of software processes and (ii), for each respective software process of the plurality of software processes, one or more attributes corresponding to the respective software process. Updating the shared classification model may also include applying the rule-based discovery pattern to the plurality of data to identify therein a subset of the plurality of software processes having the preferred classification. Updating the shared classification model may further include training an ML classifier based on the subset of the plurality of software processes and the one or more attributes corresponding to each software process of the subset to (i) generate the preferred classification based on the one or more additional attributes and (ii) suggest the revised classifier for software processes associated with the one or more additional attributes.

In some embodiments, the shared classification model comprises an ML model trained to determine a respective suggested classifier of the plurality of classifiers for a respective software process based on one or more corresponding attributes of the respective software process. Determining the suggested classifier for the software process may include providing the one or more attributes as input to the ML model and receiving as output from the ML model the suggested classifier.

In some embodiments, the one or more attributes may include one or more of: (i) a name of the software process, (ii) a command used to invoke execution of the software process, (iii) parameters provided to the software process as input, or (iv) content of a directory associated with the software process.

In some embodiments, obtaining the one or more attributes of the software process may include identifying a plurality of unclassified software processes detected within the particular managed network. Each respective unclassified software process of the plurality of unclassified software processes may be associated with one or more corresponding attributes determined by a discovery process. The respective unclassified software process and the one or more corresponding attributes may be stored in the persistent storage as part of the representation. A particular unclassified software process of the plurality of unclassified software processes may be selected for classification by way of the shared classification model. The one or more corresponding attributes associated with the particular unclassified software process may be retrieved from the persistent storage.

In some embodiments, the software process may be associated with a first classification generated by a discovery process that is not part of the shared classification model. The first classification may have a first priority level that is higher than a second priority level of the suggested classification. Receiving the indication that the suggested classification has been accepted may include providing a prompt that (i) indicates the suggested classification does not match the first classification and (ii) requests permission to replace the first classification with the suggested classification. Receiving the indication that the suggested classification has been accepted may further include receiving the permission to replace the first classification with the suggested classification.

In some embodiments, determining the suggested classifier may include determining, by way of the shared classification model, a plurality of suggested classifiers of the plurality of classifiers, providing for display of the plurality of suggested classifiers by way of a user interface associated with the discovery application, and receiving, by way of the user interface, a selection of the suggested classifier from the plurality of suggested classifiers.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
persistent storage disposed within a remote network management platform and configured to store:
a shared classification model comprising a plurality of classifiers configured to classify software applications among a plurality of predetermined categories, wherein the plurality of classifiers are based on training data acquired from a plurality of managed networks associated with the remote network management platform; and
a representation of a plurality of software applications executable on one or more computing devices within a particular managed network; and
a discovery application configured to perform operations comprising:
obtaining one or more attributes of a software process corresponding to a software application of the plurality of software applications;
determining, by way of the shared classification model and based on the one or more attributes, a suggested classifier of the plurality of classifiers;
determining, by way of the suggested classifier and based on the one or more attributes, a suggested classification for the software process;

receiving an indication that the suggested classification has been accepted;

based on receiving the indication, updating the representation to indicate the suggested classification for the software application; and storing, in the persistent storage, the representation as updated.

2. The computing system of claim 1, wherein the plurality of classifiers comprises:

a rule-based classifier based on first training data obtained from a first managed network of the plurality of managed networks, wherein the first training data comprises a rule-based discovery pattern; and a machine learning classifier based on second training data obtained from a second managed network of the plurality of managed networks, wherein the second training data comprises one or more pairs of (i) data indicating a respective software process and one or more attributes corresponding to the respective software process and (ii) a classification for the respective software process.

3. The computing system of claim 1, wherein the operations further comprise:

obtaining one or more additional attributes of an additional software process corresponding to an additional software application of the plurality of software applications;

determining, by way of the shared classification model and based on the one or more additional attributes, an additional suggested classifier of the plurality of classifiers;

determining, by way of the additional suggested classifier and based on the one or more additional attributes, an additional suggested classification for the additional software process;

receiving an additional indication that the additional suggested classification does not match a preferred classification associated by the particular managed network with the additional software application;

based on the additional indication, obtaining, from the particular managed network, a revised classifier configured to generate the preferred classification based on the one or more additional attributes;

updating the shared classification model by (i) incorporating into the shared classification model the revised classifier and (ii) reconfiguring the shared classification model to suggest the revised classifier for software processes associated with the one or more additional attributes; and storing the shared classification model as updated in the persistent storage.

4. The computing system of claim 3, wherein the revised classifier comprises a modified version of the additional suggested classifier that reconfigures the additional suggested classifier to generate the preferred classification based on the one or more additional attributes.

5. The computing system of claim 3, wherein the revised classifier is generated independently of the additional suggested classifier.

6. The computing system of claim 3, wherein the suggested classifier is a rule-based classifier, and wherein the revised classifier comprises a rule-based discovery pattern that implements logic configured to generate the preferred classification based on the one or more additional attributes.

7. The computing system of claim 3, wherein the suggested classifier is a machine learning (ML) classifier, and wherein the revised classifier comprises training data for the ML classifier, wherein the training data comprises (i) data indicating the additional software process and the one or more additional attributes and (ii) the preferred classification.

8. The computing system of claim 3, wherein the revised classifier comprises a rule-based discovery pattern that implements logic configured to generate the preferred classification based on the one or more additional attributes, and wherein updating the shared classification model comprises:

obtaining, from one or more managed networks of the plurality of managed networks, a plurality of data indicating (i) a plurality of software processes and (ii), for each respective software process of the plurality of software processes, one or more attributes corresponding to the respective software process;

applying the rule-based discovery pattern to the plurality of data to identify therein a subset of the plurality of software processes having the preferred classification; and training a machine learning classifier based on the subset of the plurality of software processes and the one or more attributes corresponding to each software process of the subset to (i) generate the preferred classification based on the one or more additional attributes and (ii) suggest the revised classifier for software processes associated with the one or more additional attributes.

9. The computing system of claim 1, wherein the shared classification model comprises a machine learning (ML) model trained to determine a respective suggested classifier of the plurality of classifiers for a respective software process based on one or more corresponding attributes of the respective software process, and wherein determining the suggested classifier for the software process comprises:

providing the one or more attributes as input to the ML model; and receiving as output from the ML model the suggested classifier.

10. The computing system of claim 1, wherein the one or more attributes comprise one or more of: (i) a name of the software process, (ii) a command used to invoke execution of the software process, (iii) parameters provided to the software process as input, or (iv) content of a directory associated with the software process.

11. The computing system of claim 1, wherein obtaining the one or more attributes of the software process comprises:

identifying a plurality of unclassified software processes detected within the particular managed network, wherein each respective unclassified software process of the plurality of unclassified software processes is associated with one or more corresponding attributes determined by a discovery process, and wherein the respective unclassified software process and the one or more corresponding attributes are stored in the persistent storage as part of the representation; and selecting a particular unclassified software process of the plurality of unclassified software processes for classification by way of the shared classification model; and retrieving, from the persistent storage, the one or more corresponding attributes associated with the particular unclassified software process.

12. The computing system of claim 1, wherein the software process is associated with a first classification generated by a discovery process that is not part of the shared classification model, wherein the first classification has a first priority level that is higher than a second priority level of the suggested classification, and wherein receiving the indication that the suggested classification has been accepted comprises:
  providing a prompt that (i) indicates the suggested classification does not match the first classification and (ii) requests permission to replace the first classification with the suggested classification; and
  receiving the permission to replace the first classification with the suggested classification.

13. The computing system of claim 1, wherein determining the suggested classifier comprises:
  determining, by way of the shared classification model, a plurality of suggested classifiers of the plurality of classifiers;
  providing for display of the plurality of suggested classifiers by way of a user interface associated with the discovery application; and
  receiving, by way of the user interface, a selection of the suggested classifier from the plurality of suggested classifiers.

14. A computer-implemented method comprising:
  obtaining, by a discovery application, one or more attributes of a software process corresponding to a software application of a plurality of software applications executable on one or more computing devices within a particular managed network, wherein persistent storage disposed within a remote network management platform is configured to store a representation of the plurality of software applications;
  determining, by the discovery application, based on the one or more attributes, and by way of a shared classification model comprising a plurality of classifiers configured to classify software applications among a plurality of predetermined categories, a suggested classifier of the plurality of classifiers, wherein the plurality of classifiers are based on training data acquired from a plurality of managed networks associated with the remote network management platform;
  determining, by the discovery application, by way of the suggested classifier, and based on the one or more attributes, a suggested classification for the software process;
  receiving, by the discovery application, an indication that the suggested classification has been accepted;
  based on receiving the indication, updating, by the discovery application, the representation to indicate the suggested classification for the software application; and
  storing, in the persistent storage, the representation as updated.

15. The computer-implemented method of claim 14, wherein the plurality of classifiers comprises:
  a rule-based classifier based on first training data obtained from a first managed network of the plurality of managed networks, wherein the first training data comprises a rule-based discovery pattern; and
  a machine learning classifier based on second training data obtained from a second managed network of the plurality of managed networks, wherein the second training data comprises one or more pairs of (i) data indicating a respective software process and one or more attributes corresponding to the respective software process and (ii) a classification for the respective software process.

16. The computer-implemented method of claim 14, further comprising:
  obtaining one or more additional attributes of an additional software process corresponding to an additional software application of the plurality of software applications;
  determining, by way of the shared classification model and based on the one or more additional attributes, an additional suggested classifier of the plurality of classifiers;
  determining, by way of the additional suggested classifier and based on the one or more additional attributes, an additional suggested classification for the additional software process;
  receiving an additional indication that the additional suggested classification does not match a preferred classification associated by the particular managed network with the additional software application;
  based on the additional indication, obtaining, from the particular managed network, a revised classifier configured to generate the preferred classification based on the one or more additional attributes;
  updating the shared classification model by (i) incorporating into the shared classification model the revised classifier and (ii) reconfiguring the shared classification model to suggest the revised classifier for software processes associated with the one or more additional attributes; and
  storing the shared classification model as updated in the persistent storage.

17. The computer-implemented method of claim 16, wherein the suggested classifier is a rule-based classifier, and wherein the revised classifier comprises a rule-based discovery pattern that implements logic configured to generate the preferred classification based on the one or more additional attributes.

18. The computer-implemented method of claim 16, wherein the suggested classifier is a machine learning (ML) classifier, and wherein the revised classifier comprises training data for the ML classifier, wherein the training data comprises (i) data indicating the additional software process and the one or more additional attributes and (ii) the preferred classification.

19. The computer-implemented method of claim 16, wherein the revised classifier comprises a rule-based discovery pattern that implements logic configured to generate the preferred classification based on the one or more additional attributes, and wherein updating the shared classification model comprises:
  obtaining, from one or more managed networks of the plurality of managed networks, a plurality of data indicating (i) a plurality of software processes and (ii), for each respective software process of the plurality of software processes, one or more attributes corresponding to the respective software process;
  applying the rule-based discovery pattern to the plurality of data to identify therein a subset of the plurality of software processes having the preferred classification; and
  training a machine learning classifier based on the subset of the plurality of software processes and the one or more attributes corresponding to each software process of the subset to (i) generate the preferred classification based on the one or more additional attributes and (ii) suggest the revised classifier for software processes associated with the one or more additional attributes.

20. An article of manufacture including a non-transitory computer-readable medium, having stored thereon program instructions that, upon execution by a computing system, cause the computing system to perform operations comprising:

obtaining one or more attributes of a software process corresponding to a software application of a plurality of software applications executable on one or more computing devices within a particular managed network, wherein persistent storage disposed within a remote network management platform is configured to store a representation of the plurality of software applications;

determining, based on the one or more attributes and by way of a shared classification model comprising a plurality of classifiers configured to classify software applications among a plurality of predetermined categories, a suggested classifier of the plurality of classifiers, wherein the plurality of classifiers are based on training data acquired from a plurality of managed networks associated with the remote network management platform;

determining, by way of the suggested classifier and based on the one or more attributes, a suggested classification for the software process;

receiving an indication that the suggested classification has been accepted;

based on receiving the indication, updating the representation to indicate the suggested classification for the software application; and storing, in the persistent storage, the representation as updated.

21. The computing system of claim 1, wherein the discovery application is configured to perform operations comprising:

discovering the software application of the plurality of software applications on a computing device of the one or more computing devices within the particular managed network, wherein the discovering operation comprises:

transmitting, to the computing device of the one or more computing devices within the particular managed network, a probe for the software process executing on the computing device, wherein the software process corresponds to the software application of the plurality of software applications.

\* \* \* \* \*